(12) United States Patent
Helf

(10) Patent No.: US 8,752,422 B2
(45) Date of Patent: Jun. 17, 2014

(54) BRAKE WEAR SENSOR OF A DISC BRAKE

(71) Applicant: KNORR-BREMSE Systeme fuer Nutzfahrzeuge GmbH, Munich (DE)

(72) Inventor: Anton Helf, Soechtenau (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/750,323

(22) Filed: Jan. 25, 2013

(65) Prior Publication Data

US 2013/0139580 A1 Jun. 6, 2013

Related U.S. Application Data

(63) Continuation of application No. PCT/EP2011/062900, filed on Jul. 27, 2011.

(30) Foreign Application Priority Data

Jul. 28, 2010 (DE) .......................... 10 2010 032 515

(51) Int. Cl.
*G01L 5/28* (2006.01)
*F16D 66/02* (2006.01)

(52) U.S. Cl.
CPC . *G01L 5/28* (2013.01); *F16D 66/02* (2013.01); *F16D 66/024* (2013.01)
USPC .......................................................... 73/121

(58) Field of Classification Search
CPC ......... G01L 5/28; F16D 66/02; F16D 66/024; F16D 65/568; F16D 66/025; F16D 66/021; B60T 17/221
USPC .......................................................... 73/121
See application file for complete search history.

(56) References Cited

U.S. PATENT DOCUMENTS

| 3,830,343 | A | 8/1974 | Gardner |
| 4,596,319 | A * | 6/1986 | Cumming .................. 188/79.55 |
| 5,207,299 | A | 5/1993 | Feldmann |
| 6,129,183 | A | 10/2000 | Ward |
| 6,276,494 | B1 * | 8/2001 | Ward et al. ............... 188/1.11 W |
| 6,412,607 | B2 * | 7/2002 | Ohba et al. ................... 188/71.9 |
| 6,634,465 | B1 * | 10/2003 | Tuschen .................... 188/1.11 L |
| 7,299,899 | B2 | 11/2007 | Severinsson et al. |
| 2006/0149440 | A1 | 7/2006 | Pettersson et al. |

FOREIGN PATENT DOCUMENTS

| DE | 40 17 950 A1 | 12/1991 |
| DE | 42 43 875 C2 | 4/1996 |
| DE | 103 90 447 T5 | 4/2004 |

OTHER PUBLICATIONS

International Preliminary Report on Patentability (PCT/IB/338 & PCT/IB/373), including Written Opinion (PCT/ISA/237) dated Feb. 7, 2013 (eight (8) pages).
International Search Report dated Jun. 22, 2012 including English-language translation (Four (4) pages).
German Office Action dated Feb. 15, 2011 including English-language translation (Seven (7) pages).

* cited by examiner

*Primary Examiner* — Freddie Kirkland, III
(74) *Attorney, Agent, or Firm* — Crowell & Moring LLP

(57) ABSTRACT

A brake wear sensor of a disc brake includes a sensor unit, a gearbox cooperating with the sensor unit, and a central drive element which is engaged with the gearbox for an input variable or characteristic variable associated with brake wear. The brake wear sensor also includes at least one additional input for a further input variable or characteristic variable.

19 Claims, 5 Drawing Sheets

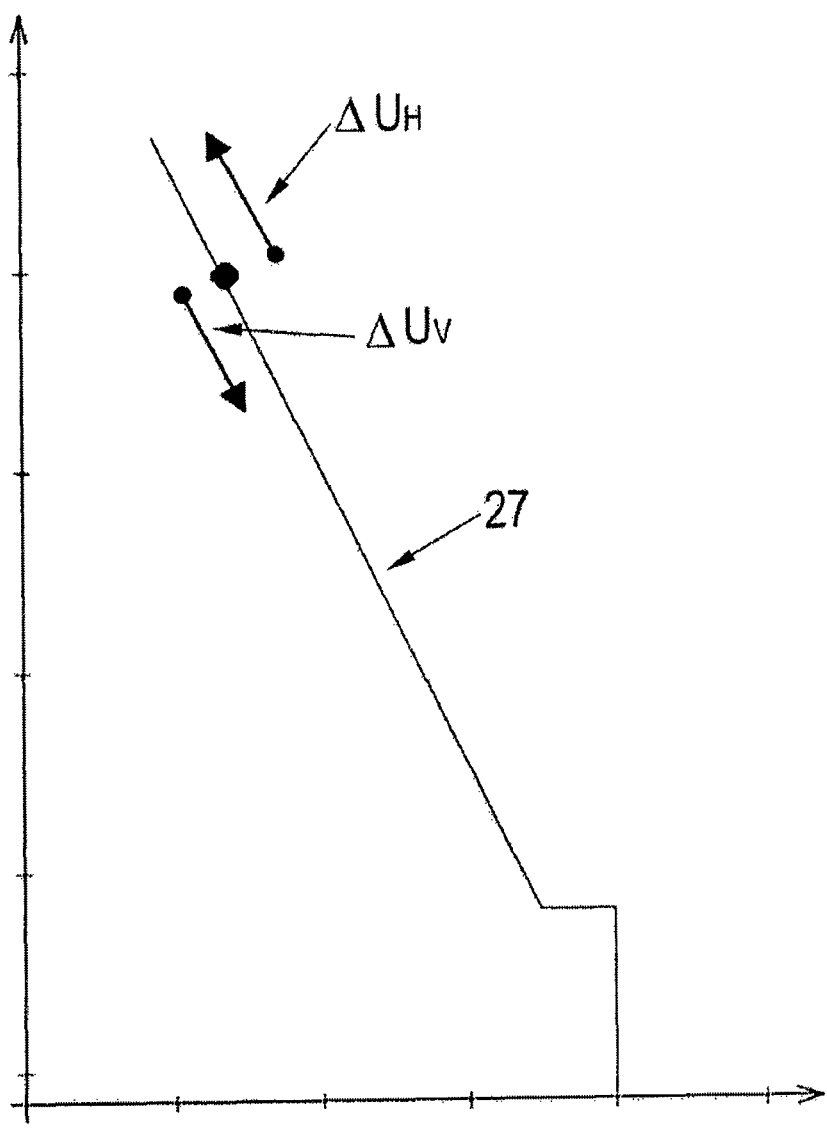

BRAKE WEAR SENSOR OF A DISC BRAKE

CROSS REFERENCE TO RELATED APPLICATIONS

This application is a continuation of PCT International Application No. PCT/EP2011/062900, filed Jul. 27, 2011, which claims priority under 35 U.S.C. §119 from German Patent Application No. DE 10 2010 032 515.5, filed Jul. 28, 2010, the entire disclosures of which are herein expressly incorporated by reference

BACKGROUND AND SUMMARY OF THE INVENTION

The invention relates to a brake wear sensor of a disc brake, as well as to a method for associating a measurement signal of a brake wear sensor of this type.

Disc brakes of different designs are known and are often fitted with a sensor for determining wear of the brake pads and the brake disc. In one embodiment, a brake wear sensor of this kind has a potentiometer, which can be adjusted by means of a planetary mechanism. In this case, the planetary mechanism is coupled to an adjustment device, the adjustment travel of which is transmitted as a rotation angle to the planetary mechanism. The potentiometer can already be provided with an integrated electronic system for conditioning measurement signals.

Such brake wear sensors have proven very successful. Given the constantly growing automation and monitoring of brakes and braking processes, there is a requirement to detect additional characteristic variables. One such variable is the stroke of a pivoted braking lever of such a disc brake, for example. However, an additional sensor which requires a corresponding installation space and associated installation costs, including the outlay on components, is required to sense each additional characteristic variable.

It is therefore an object of the present invention to provide an improved brake wear sensor.

This and other objects are achieved by a brake wear sensor, and an associated operating method, designed so that the brake wear sensor detects at least two different input or characteristic variables.

Accordingly, a brake wear sensor of a disc brake has the following: a sensor unit; a mechanism interacting with the sensor unit; and a central drive element, which is in engagement with the mechanism, for an input or characteristic variable associated with brake wear, wherein the brake wear sensor has at least one additional input for a further input or characteristic variable.

By means of this additional input on a brake wear sensor, it is possible, on the one hand, to use most existing components. Moreover, this means that no further sensor involving expensive electronics is necessary to detect an additional characteristic variable or, indeed, a plurality of variables.

The at least one additional measurement signal can be produced merely by modifying the arrangement of the existing components in the sensor and by adding a further drive option to the existing mechanism.

In this arrangement, the existing mechanism is expanded by the at least one additional input, thereby obtaining the additional ability for adjustment by way of the additional input. Only a few modifications or additions are required for this purpose, and these do not significantly increase the existing installation space. There is no need for an additional sensor for the additional characteristic variable.

In one embodiment, the at least one additional input is in interaction with the mechanism via an additional drive mechanism. In a simple embodiment, this can be a spur wheel mechanism, wherein an additional drive element has the spur wheel, which is in engagement with toothing or additional toothing on a gearwheel. A worm gear mechanism, a bevel wheel mechanism, a coupling rod, a tappet or a cam mechanism are also possible for this purpose, either individually or in combination with appropriate corresponding mating parts on the mechanism. It is expedient for the sensor to be pressed against a stop by the force of a return spring in the rest position.

In a preferred embodiment, the mechanism of the brake wear sensor, which interacts with the sensor unit, is a planetary mechanism. It is a simple matter here, for example, to provide a planet carrier wheel with a drive section which forms part of the additional drive mechanism. The drive section can be formed by external toothing or internal toothing, for example.

The sensor unit can be a potentiometer; of course, it can also be an electronic device for processing and conditioning or evaluating measurement signals.

The sensor unit can also have an inductive and/or capacitive pick-up, either alone or in combination with other pick-ups. In this case, an electronic device in the sensor unit can adapt, e.g. digitize, the measurement signals in an appropriate manner for further processing, for example. Moreover, inductive and capacitive pick-ups offer the advantage of contactless and, hence, frictionless actuation and are furthermore maintenance-free.

A method for associating a measurement signal of a brake wear sensor of a disc brake with one of at least two different input or characteristic variables of the brake wear sensor is characterized in that the measurement signal is associated with, in each case, one of the at least two different input or characteristic variables of the brake wear sensor, depending on different operating states of the disc brake.

For this purpose, an evaluation device can, for example, be integrated into a brake control unit or, alternatively, can be arranged separately, receiving existing brake system signals and data relating to the respective state and evaluating them in order to evaluate the measurement signals of the brake wear sensor.

A disc brake includes the brake wear sensor described above.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows a schematic characteristic of the brake wear sensor according to the embodiment as shown in FIG. 2.

DETAILED DESCRIPTION OF THE DRAWINGS

Identical components and functional units with the same function are indicated by identical reference signs in the figures.

Figure 1:
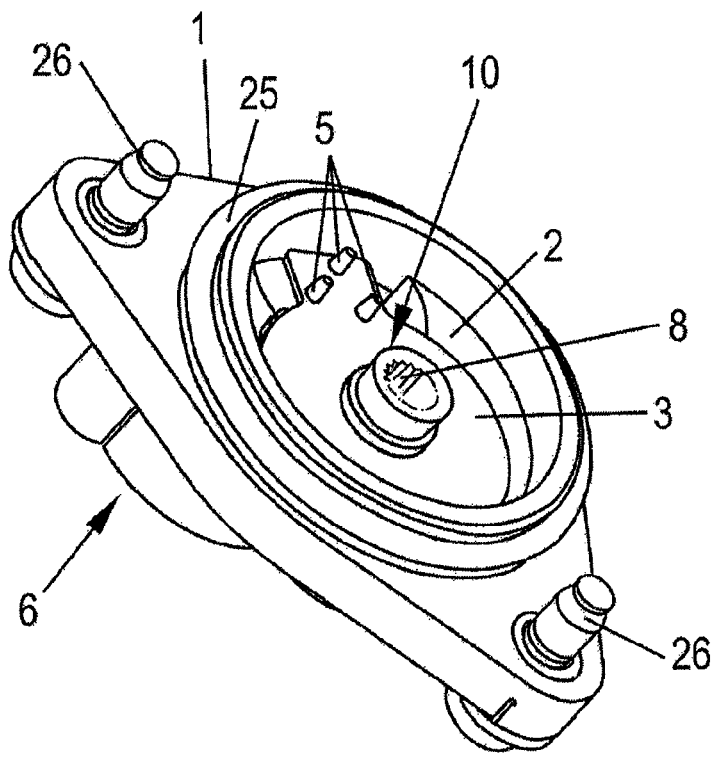
FIG. 1 shows a schematic perspective view of an opened brake wear sensor according to the prior art.

FIG. 1 shows a schematic perspective view of an opened brake wear sensor according to the prior art. The conventional brake wear sensor has a housing 1, in which a cylindrical chamber 2 is formed to accommodate a sensor unit 3. In operation, this chamber 2 is provided with a closing cover, not shown here, which fixes the sensor components. Here, a fastening side of the housing 1 is shown. This side is attached to the brake, e.g. to a brake caliper, and is sealed off by use of a seal 25, e.g. an O-ring. Fastening elements 26, e.g. screws, arranged in lug-type extensions of the housing 1 are used for the fastening.

On the opposite side from the fastening side, there is a terminal section 6 for receiving a plug for an electrical connection at contact pins 5, which are connected to the sensor unit 3. The sensor unit 3 has a pick-up, which converts a mechanical variable into an electrical variable. Here, this is a variable electrical resistance in the form of a potentiometer, which can have additional electronics and can be adjusted by a mechanism 10, in this case a planetary mechanism, via a central drive element 8 in accordance with brake wear (brake pad and brake disc wear) of an associated disc brake.

For this purpose, the central drive element 8 can be coupled directly or indirectly, e.g. via a matched further mechanism, to a brake adjustment device. The adjustment device adjusts the brake pad or pads of the associated brake in accordance with brake wear by converting a rotation into a linear adjusting movement. The rotation takes place during a braking operation, e.g. by means of a pivoted braking lever, when a predetermined value is exceeded. A rotation angle of the rotation of the adjustment device thus corresponds to an amount of brake wear in a unit of length, e.g. mm. The rotation angle is transmitted by way of the planetary mechanism to the potentiometer, which, for its part, converts the rotation angle into an electrical resistance value. The electrical resistance can be measured by way of an electric voltage or an electric current, this voltage and/or current representing the rotation angle, the unit of length of an adjustment and hence the measured variable of the brake wear.

Figure 2:
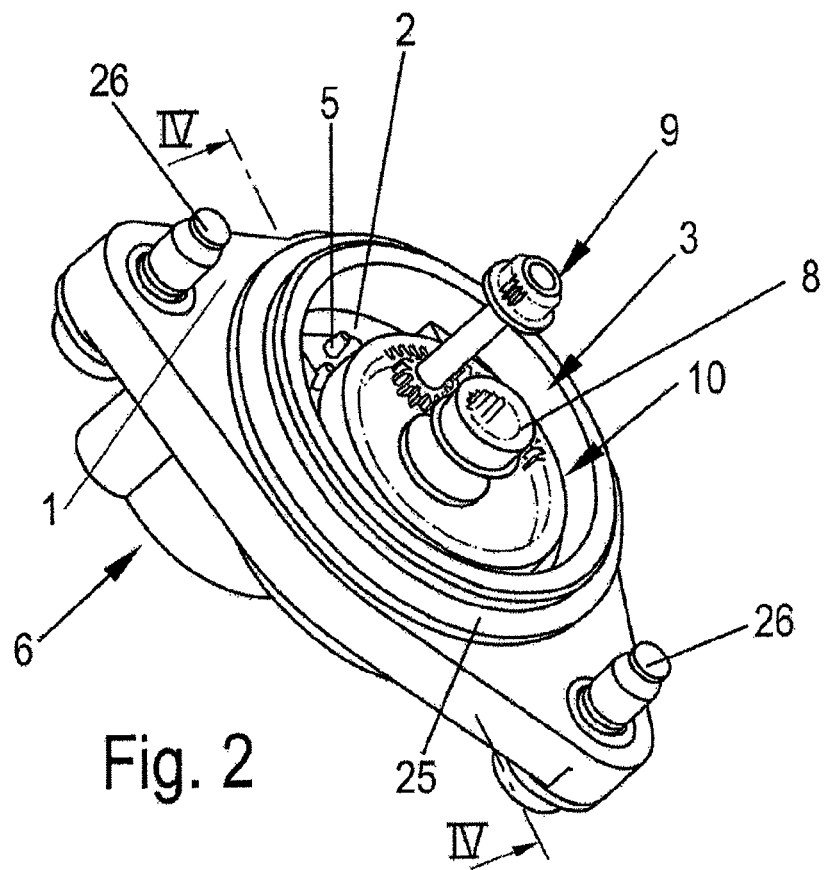
FIG. 2 shows a schematic perspective view of an opened brake wear sensor according to an embodiment of the invention.

FIG. 2 shows a schematic perspective view of an opened brake wear sensor according to an embodiment of the invention.

In contrast to the brake wear sensor according to the prior art as shown in FIG. 1, the brake wear sensor in FIG. 2 has an additional drive element 22 (see exploded view of FIG. 3) in addition to the central drive element 8 for a first input or characteristic variable. The additional drive element 22 serves as an additional input 9 for the detection of a second, additional input or characteristic variable. In this case, the first input variable is the brake wear and the additional input variable is a further characteristic variable, e.g. the lever stroke of a pivoted braking lever, which is pivoted during a braking operation in order to apply the brake or the brake pad or brake pads and, at the same time, also adjusts the adjustment device if the predetermined value is exceeded.

Here, the additional drive element 22 as an additional input 9 also interacts, like the central drive element 8, with the mechanism 10 and forms an additional means of adjusting the latter and hence of adjusting the pick-up of the sensor unit 3.

Figure 3:
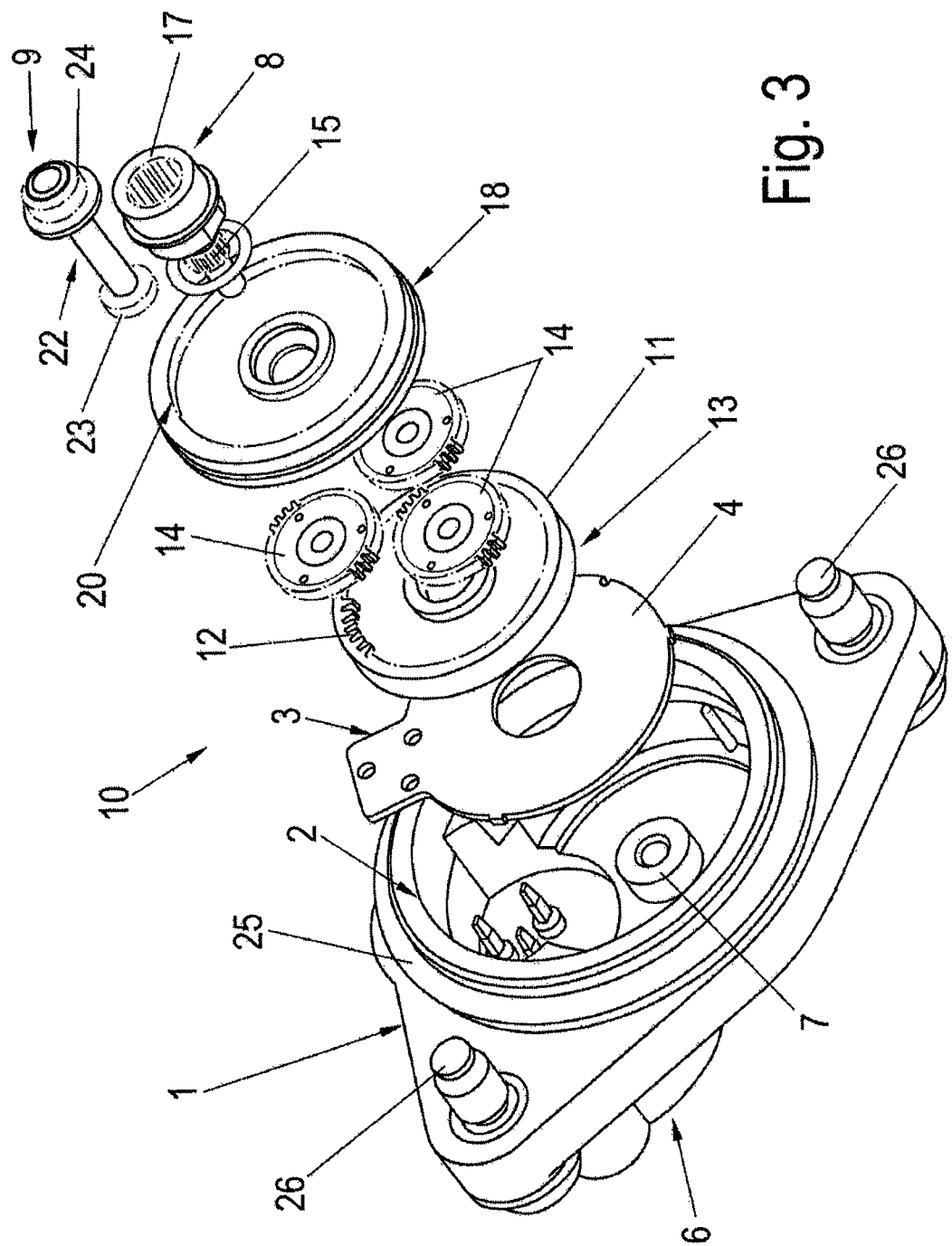
FIG. 3 shows a schematic exploded perspective view of a planetary mechanism having a sensor unit of the brake wear sensor according to the embodiment as shown in FIG. 2.
Figure 4:
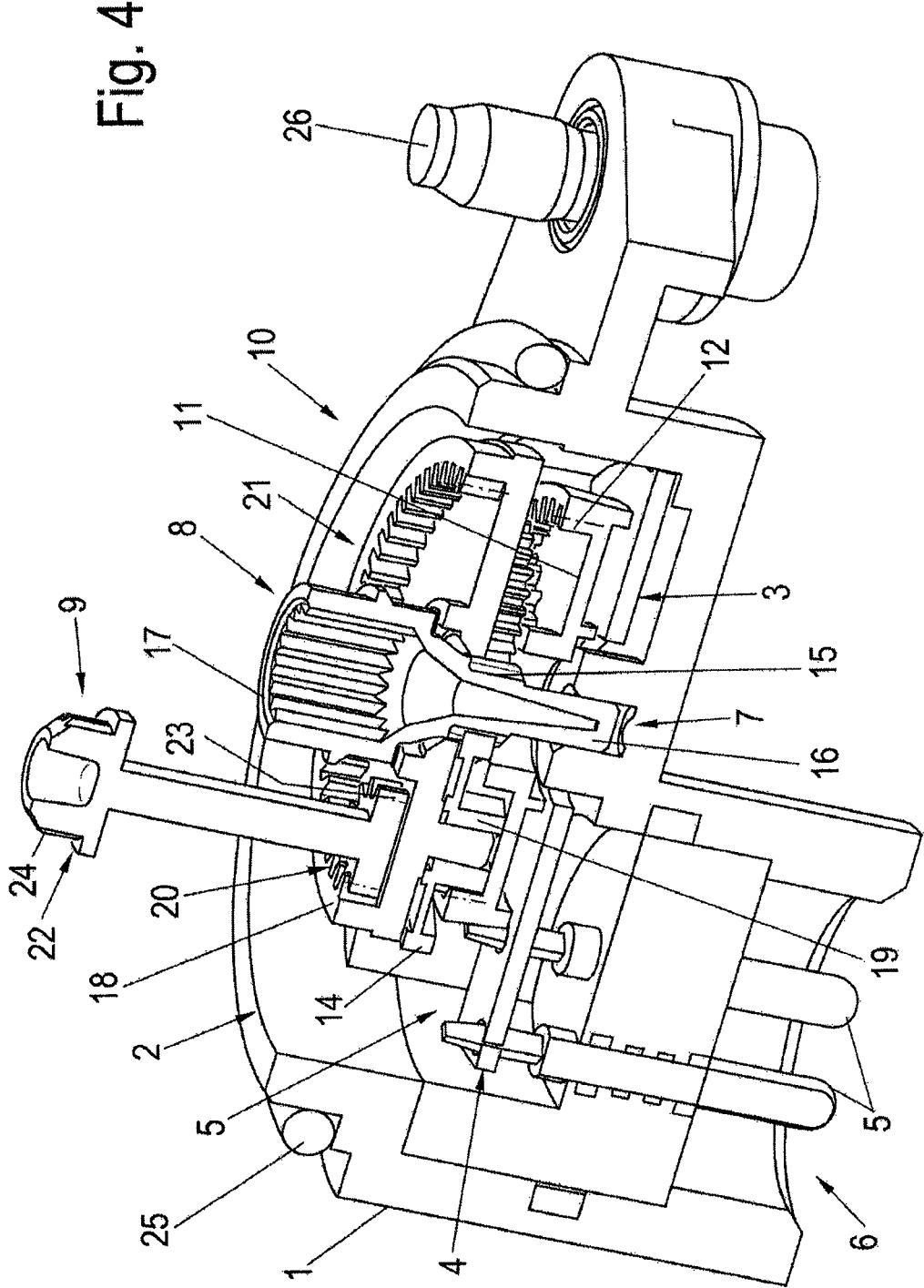
FIG. 4 shows a sectioned perspective view taken along the line IV-IV of the brake wear sensor according to the embodiment as shown in FIG. 2.

FIG. 3 shows a schematic exploded perspective view of the mechanism 10 as a planetary mechanism having a sensor unit 3 of the brake wear sensor shown in FIG. 2, and FIG. 4 represents a corresponding perspective sectioned view taken along the line IV-IV of the brake wear sensor shown in FIG. 2.

Here, the terms "at the bottom" and "underside" denote the direction toward the bottom of the chamber 2 of the housing 1 and the terms "at the top" and "upper side" denote the opposite direction in relation thereto.

Here, the sensor unit 3 includes a circuit board 4, which is arranged in a manner secured against rotation (in the figure, projections in the chamber wall and on the circuit board and corresponding recesses are indicated for this purpose) in the chamber 2 of the housing 1, on the bottom of the latter, and is provided with a lug, which is used for connection to the contacts 5, e.g. by means of cut connections. In the center, the bottom of the chamber 2 is provided with a dome-like cylindrical bearing section 7, which in the center forms a receptacle for the central drive element 8. The circuit board 4 has a through opening, which is matched to the outer contour of the bearing section 7 and through which the bearing section 7 extends in the assembled state (FIG. 4). On this circuit board 4, there are, for example, on the upper side a resistance path (not shown) or a plurality thereof and a contact path, which is connected electrically to the contacts 5 and/or electronic components. With an actuating section 13 of the planetary mechanism 10, the resistance path and the contact path form a potentiometer. The actuating section 13 can be a wiper, for example, and, in this case, is attached to the underside of an annulus 11 of the planetary mechanism.

The planetary mechanism includes the annulus 11 with internal toothing 12, three planet wheels 14 with external toothing, a planet carrier wheel 18 and a sun wheel 15 with external toothing, which is coupled to the central drive element 8. The annulus 11, the actuating section 13, the planet carrier wheel 18 and the sun wheel 15 are arranged coaxially together with the potentiometer or the pick-up.

The annulus 11 is arranged with the actuating section 13 above the circuit board 4, as can be seen from FIG. 4. The internal toothing 12 thereof is in engagement with the planet wheels 14, which are mounted rotatably on the underside of the planet carrier wheel 18 by means of planet bearings 19. Here, the planet bearings 19 consist of journals on the underside of the planet carrier wheel 18, on which journals the planet wheels 14 are rotatably mounted. The sun wheel 15 is arranged in the center between the planet wheels 14, in engagement with the latter. The sun wheel 15 is part of the central drive element 8, which is formed from a shaft, which has the sun wheel 15 approximately in the center, extends from above through an opening in the planet carrier 18 in the assembled state of the planetary mechanism (FIG. 4) and is rotatably accommodated by means of a lower bearing end 16 in the receptacle of the bearing section 7 of the housing 1. The other end of the central drive element 8 is widened radially and formed into a drive end 17 with internal toothing or an inner profile.

On its upper side, at its encircling rim, the planet carrier wheel 18 has a drive section 20, with which the additional drive element 22 is in operative connection by way of an additional drive mechanism 21. In this example, the additional drive mechanism 21 is designed as a gearwheel mechanism, wherein the drive section 20 of the planet carrier wheel 18 is provided with internal toothing, which is in engagement with external toothing on an output wheel 23 of the additional drive element 22. In this case, the additional drive element 22 is a shaft, the lower end of which has the output wheel 23 and the upper end of which is provided, as an additional input 9, with an input wheel 24, which in this case has external toothing. Here, the additional drive element 22 is arranged in such a way that the longitudinal axis thereof extends, at a distance, parallel to the axis of the planetary mechanism.

In this illustrative embodiment, the input wheel 24 of the additional drive element 22 may be directly or indirectly in operative connection with the pivoted braking lever of the associated disc brake via a further mechanism. The second input or characteristic variable at the additional input 9 of the brake wear sensor is therefore the pivoting or stroke movement of the pivoted braking lever. The additional drive element 22 can be mounted in the closing cover (not shown) of the chamber 2 of the housing 1 in such a way as to be rotatable about its longitudinal axis, for example.

Figure 5:
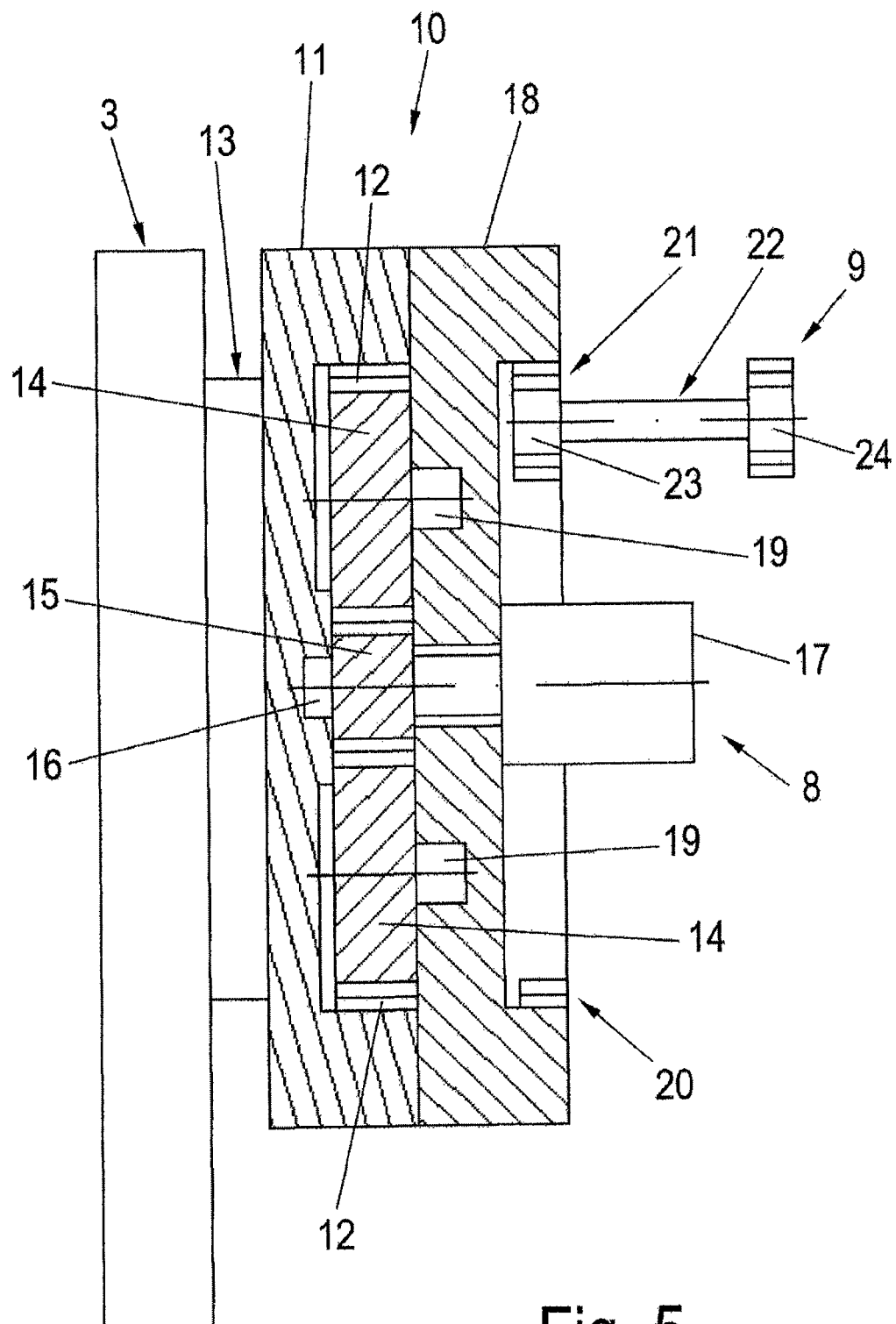
FIG. 5 shows a schematic sectioned view of the mechanism shown in FIG. 4.

To explain the action of the two input or characteristic variables on the brake wear sensor, FIG. 5 shows a schematic sectioned view of the mechanism shown in FIG. 4. FIG. 6, which shows a schematic characteristic of the brake wear sensor shown in FIG. 2, is explained at the same time in this context.

FIG. 5 shows a variant of the planet bearings 19, wherein the planet wheels 14 each have a bearing journal, which is rotatably accommodated in a bearing receptacle of the planet carrier wheel 14. The planet wheels 14 are shown as being of single-stage design. Of course, they can be of two- or even multi-stage design. In defining the directions of rotation of the central drive element 8 and of the additional drive element 22, the planetary mechanism is viewed from the upper side (from the right in FIG. 5).

When the central drive element 8 is subjected to a clockwise rotary motion only of the first input or characteristic variable, e.g. a wear adjustment, it is assumed in this first case that the planet carrier wheel 18 is fixed. The sun wheel 15 rotates the planet wheels 14 counterclockwise via the toothing. This then results in rotation of the annulus 11 by way of the internal toothing 12 thereof, which is in engagement with the planet wheels 14, likewise in the counterclockwise direction. This rotary motion of the annulus 11 is transmitted via the actuating section 13 to the potentiometer of the sensor unit 3. As a result, the resistance of the potentiometer, which is supplied with an electric voltage in a circuit (not described specifically), and which resistance is picked off via the wiper of the actuating section 13, changes in such a way that an electric voltage measured at the wiper in this example is increased.

FIG. 6 shows a sensor characteristic 27, which represents a relationship between a voltage (abscissa) measured at the sensor unit 3 and a wear travel or stroke (ordinate). An increase in the voltage owing to the first input or characteristic variable, starting from an initial value indicated by a circle on the sensor characteristic 27, shows that this value is shifting in the direction of the arrow $\Delta U_V$. A wear value corresponding thereto is obtained on the ordinate.

If, in a second case, the brake wear sensor is then also subjected to a clockwise rotary motion only with the second input or characteristic variable, e.g. as the stroke of the pivoted braking lever, via the additional input 9, and the sun wheel 15 and the central drive element 8 are fixed at the same time, the planet carrier wheel 18 also rotates clockwise and thus produces a rotary motion of the planet wheels 14 about the fixed sun wheel 15. As a result, a clockwise rotary motion is likewise imparted to the annulus 11.

In this second case, the direction of rotation of the actuating section 13 for the potentiometer is thus reversed, and the starting point on the sensor characteristic 27 is shifted upward on the latter in the direction of the arrow $\Delta U_H$, since the measured voltage is lowered. The associated stroke of the pivoted braking lever (starting from the starting point) can likewise be determined on the ordinate.

In a third case, the case where the brake wear sensor is supplied simultaneously with the first and second input or characteristic variables in the same directions of rotation is considered. Here, there is a differential movement of the actuating section 13.

And, in a fourth case, which represents a special case of the third case, the second input or characteristic variable is reset to its starting position again. This is brought about by the stroke of the pivoted braking lever. At the beginning of a braking operation, the pivoted braking lever pivots out of its rest position into a deflected position and, at the end of the braking operation, it pivots back into its rest position. However, the adjusting movement initiated thereby, as a first input or characteristic variable, remains in the new position.

From this, it is apparent that the various measurement signals output by a sensor unit 3 for the two different input or characteristic variables can be associated with these two different input or characteristic variables by a suitable evaluation using boundary conditions. These boundary conditions are obtained from the operating state of the brake, e.g. from information in a brake control system associated therewith. In the unactuated state of the brake, the measurement signal output by the brake wear sensor is a measure of the adjustment and thus of the wear. In the case of a brake actuation, the measurement signal is associated with the stroke of the pivoted braking lever. The normal stroke of the pivoted braking lever can be stored in advance in a memory of an electronic evaluation system. Deviations from this stored "normal value" during a brake actuation can then be distinguished, at the end of the braking operation, by means of a change which has then occurred in the wear value, representing a wear adjustment carried out, from other deviations that do not involve a change in the wear value.

Thus, both static and dynamic measurement signals for the two input or characteristic variables can be output with just a single brake wear sensor.

The wear measurement can furthermore be compared with a predeterminable limiting value in order to indicate when replacement of the brake pads and/or the brake disc is necessary.

The static or dynamic measurement signal for the stroke of the pivoted braking lever can be linked with an evaluation of a braking deceleration of the vehicle, for example, in order to assess braking behavior or to detect deviations from normal braking behavior.

As described above for a potentiometer embodiment with a wiper in the sensor unit 3, this principle can also be used for a contactless variant, which furthermore offers advantages, e.g. freedom from maintenance and friction. A contactless variant of this kind can have inductive and/or capacitive pick-ups with analog and/or digital output of measurement signals.

The additional drive mechanism 21 for transmitting the second input or characteristic variable (in this case the stroke of the pivoted braking lever) to the brake wear sensor can also be constructed with a worm or bevel wheel gear, a coupling rod or by way of a tappet, instead of the illustrated embodiment with spur wheel toothing. Cam actuation is also contemplated. It is expedient if the sensor is pressed against a stop by the force of a return spring in the rest position.

More additional drive elements for more than one additional input or characteristic variable are also possible in accordance with the above teachings.

LIST OF REFERENCE NUMERALS

1 housing
2 chamber 3 sensor unit
4 circuit board
5 contact pin
6 terminal section
7 bearing section
8 central drive element
9 additional input
10 mechanism
11 annulus
12 internal toothing
13 actuating section
14 planet wheel
15 sun wheel
16 bearing end
17 drive end
18 planet carrier wheel
19 planet bearing
20 drive section
21 additional drive mechanism
22 additional drive element
23 output wheel
24 input wheel
25 seal
26 fastening element
27 sensor characteristic The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake wear sensor of a disc brake, comprising:
   a sensor unit;
   a mechanism interacting with the sensor unit;
   a central drive element, which is in engagement with the mechanism, and is operatively configured such that relative motion between the central drive element and the mechanism generates an indication of an input variable or characteristic variable corresponding to an amount of brake wear;
   at least one additional input element operatively configured such that relative motion between the at least one additional input element and the mechanism generates an indication of a further input variable or characteristic variable.

2. The brake wear sensor as claimed in claim 1, wherein the at least one additional input element interacts with the mechanism.

3. The brake wear sensor as claimed in claim 2, wherein the at least one additional input element is coupled to the mechanism by an additional drive mechanism.

4. The brake wear sensor as claimed in claim 3, wherein the additional drive mechanism is configured as one of: a spur wheel mechanism, a worm gear mechanism, a bevel wheel mechanism, a coupling rod, a tappet and a cam mechanism.

5. The brake wear sensor as claimed in claim 2, wherein the mechanism is a planetary mechanism.

6. The brake wear sensor as claimed in claim 3, wherein the mechanism is a planetary mechanism.

7. The brake wear sensor as claimed in claim 5, wherein the additional drive mechanism is coupled to a planet carrier wheel of the planetary mechanism.

8. The brake wear sensor as claimed in claim 6, wherein the additional drive mechanism is coupled to a planet carrier wheel of the planetary mechanism.

9. The brake wear sensor as claimed in claim 1, wherein the sensor unit comprises a potentiometer.

10. The brake wear sensor as claimed in claim 1, wherein the sensor unit comprises at least one of an inductive and capacitive pick-up.

11. A method of operating a brake wear sensor of a disc brake, the method comprising the acts of:
    determining different operating states of the disc brake; and
    associating a measurement signal of the brake wear sensor of the disc brake with, in each case, one of at least two different input variables or characteristic variables of the brake wear sensor depending on the determined operating state;
    wherein the brake wear sensor comprises a sensor unit, a mechanism interacting with the sensor unit, a central drive element in engagement with the mechanism and being configured such that relative motion between the central drive element and the mechanism generates an indication of a first input variable or first characteristic variable core an amount of brake wear, and an additional input element configured such that relative motion between the at least one additional input element and the mechanism generates an indication of a second input variable or second characteristic variable, the first and second input variables or characteristic variables being two of the at least two different input variables or characteristic variables of the brake wear sensor.

12. A disc brake, comprising:
    a brake wear sensor, wherein the brake wear sensor comprises:
    a sensor unit;
    a mechanism interacting with the sensor unit;
    a central drive element, which is in engagement with the mechanism, and is operatively configured such that relative motion between the central drive element and the mechanism generates an indication of an input variable or characteristic variable corresponding to an amount of brake wear; and
    at least one additional input element operatively configured such that relative motion between the at least one additional input element and the mechanism generates an indication of a further input variable or characteristic variable.

13. The disc brake as claimed in claim 12, wherein the at least one additional input element interacts with the mechanism.

14. The disc brake as claimed in claim 13, wherein the at, least one additional input element is coupled to the mechanism by an additional drive mechanism.

15. The disc brake as claimed in claim 14, wherein the additional drive mechanism is configured as one of: a spur wheel mechanism, a worm gear mechanism, a bevel wheel mechanism, a coupling rod, a tappet and a cam mechanism.

16. The disc brake as claimed in claim 12, wherein the mechanism is a planetary mechanism.

17. The disc brake as claimed in claim 14, wherein the additional drive mechanism is coupled to a planet carrier wheel of the planetary mechanism.

18. The disc brake as claimed in claim 12, wherein the sensor unit comprises a potentiometer.

19. The disc brake as claimed in claim 12, wherein the sensor unit comprises at least one of an inductive and capacitive pick-up.

* * * * *